(12) United States Patent
Pastor Balbás et al.

(10) Patent No.: US 8,725,881 B2
(45) Date of Patent: May 13, 2014

(54) RESOURCES ALLOCATION FLEXIBILITY

(75) Inventors: Jose Javier Pastor Balbás, Madrid (ES); Susana Fernandez Alonso, Madrid (ES); Juan-Antonio Ibanez, Solna (SE); Maria Belen Pancorbo Marcos, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 270 days.

(21) Appl. No.: 13/146,430

(22) PCT Filed: May 26, 2009

(86) PCT No.: PCT/IB2009/005724
§ 371 (c)(1),
(2), (4) Date: Jul. 27, 2011

(87) PCT Pub. No.: WO2010/086687
PCT Pub. Date: Aug. 5, 2010

(65) Prior Publication Data
US 2011/0296032 A1 Dec. 1, 2011

Related U.S. Application Data

(60) Provisional application No. 61/148,103, filed on Jan. 29, 2009.

(51) Int. Cl.
*G06F 15/16* (2006.01)
(52) U.S. Cl.
USPC ............................ 709/227; 709/228; 709/229
(58) Field of Classification Search
USPC ................................. 709/227, 225, 228, 229
See application file for complete search history.

(56) References Cited

U.S. PATENT DOCUMENTS

2008/0271113 A1* 10/2008 Belling .............................. 726/1

FOREIGN PATENT DOCUMENTS

WO 2009/089904 A1 7/2009

OTHER PUBLICATIONS

3rd Generation Partnership Project. Technical Specification Group Core Network and Terminals; Policy and Charging Control over Rx Reference Point (Release 8); 3GPP TS 29.214 V8.3.0 (Dec. 2008).*

(Continued)

*Primary Examiner* — Yemane Mesfin
*Assistant Examiner* — Jeff Banthrongsack
(74) *Attorney, Agent, or Firm* — Coats & Bennett, P.L.L.C.

(57) ABSTRACT

A method for an application function (AF) device in a wireless cellular network including the steps of determining with a processing unit whether an application service requires confirmation that a transmission path for corresponding application service media is available to progress set up of an application service session. There is the step of sending a message generated by the processing unit through a network interfacing unit to a policy and charging rule function (PCRP) server to indicate whether the application service requires confirmation that the transmission path for the corresponding application service media is available. An application function (AF) device in a wireless cellular network including a processing unit which determines whether an application service requires confirmation that a transmission path for corresponding application service media is available to progress set up of an application service session. The AF device includes a network interfacing unit that sends a message generated by the processing unit to a policy and charging rule function (PCRF) server indicating whether the application service requires confirmation that the transmission path for the corresponding application service media is available. A method for a policy and charging rule function (PCRF) server in a wireless cellular network. A policy and charging rule function (PCRF) server in a wireless cellular network.

21 Claims, 7 Drawing Sheets

(56) References Cited

OTHER PUBLICATIONS

3rd Generation Partnership Project. 3GPP TS 29.214, V8.3.0 (Dec. 2008). 3rd Generation Partnership Project; Technical Specification Group Core Network and Terminals; Policy and Charging Control over Rx reference point (Release 8). Dec. 2008.

3rd Generation Partnership Project. 3GPP TS 23.203, V8.4.0 (Dec. 2008). 3rd Generation Partnership Project; Technical Specification Group Services and System Aspects; Policy and charging control architecture (Release 8). Dec. 2008.

3rd Generation Partnership Project. 3GPP TR 23.822, V0.2.0 (Feb. 2008). 3rd Generation Partnership Project; Technical Specification Group Services and System Aspects; Framework for Gq'/Rx Harmonication (Release 8). Feb. 2008.

3rd Generation Partnership Project, "Clarification of PCRF Procedures." 3GPP TSG-CT WG3 Meeting #45, C3-070904, Vienna, Austria, Aug. 20-24, 2007.

Lidstrom, M. et al. "Using the Policy Control System as an Auxiliary Tool to Improve the Service Assurance Process in Telecommunication Networks." 2007 IEEE Globecom Workshops, Washington, DC, USA, Nov. 26-30, 2007.

\* cited by examiner

RESOURCES ALLOCATION FLEXIBILITY

TECHNICAL FIELD

The present invention is related, in a PCC architecture, to whether an application service, such as mobile TV, requires confirmation that a transmission path for corresponding application service media is available to progress set up of an application service session.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Policy and Charging Control Architecture

Mobile TV involves bringing TV services to mobile devices. It combines the services of a mobile device with television content and represents a logical step both for consumers and operators and content providers. Mobile TV over cellular networks allows viewers to enjoy personalized, interactive TV with content specifically adapted to the mobile medium. The services and viewing experience of mobile TV over cellular networks differs in a variety of ways from traditional TV viewing. In addition to mobility, mobile TV delivers a variety of services including video-on-demand, traditional/linear and live TV programs, interactivity. Another exciting opportunity for users is Mobile TV podcasts, where content is delivered to a user's mobile on demand or by subscriptions. Stored locally on the handset, this content can then be viewed even when there's no network connection. And a service provider can schedule the delivery to "off-peak" hours, for example during the night.

Mobile TV will make use of the 3GPP PCC architecture. PCC will help Mobile TV by setting the right QoS conditions in the network.

Role of the PCC Architecture

In order to be able to provide a satisfactory and reliable service experience, operators need to take special care of the quality, effective charging and potential fraud on the use of the services provided. 3GPP has defined a Policy and Charging Control (PCC) Architecture that helps operators to be in control of the above mentioned issues.

Figure 1:
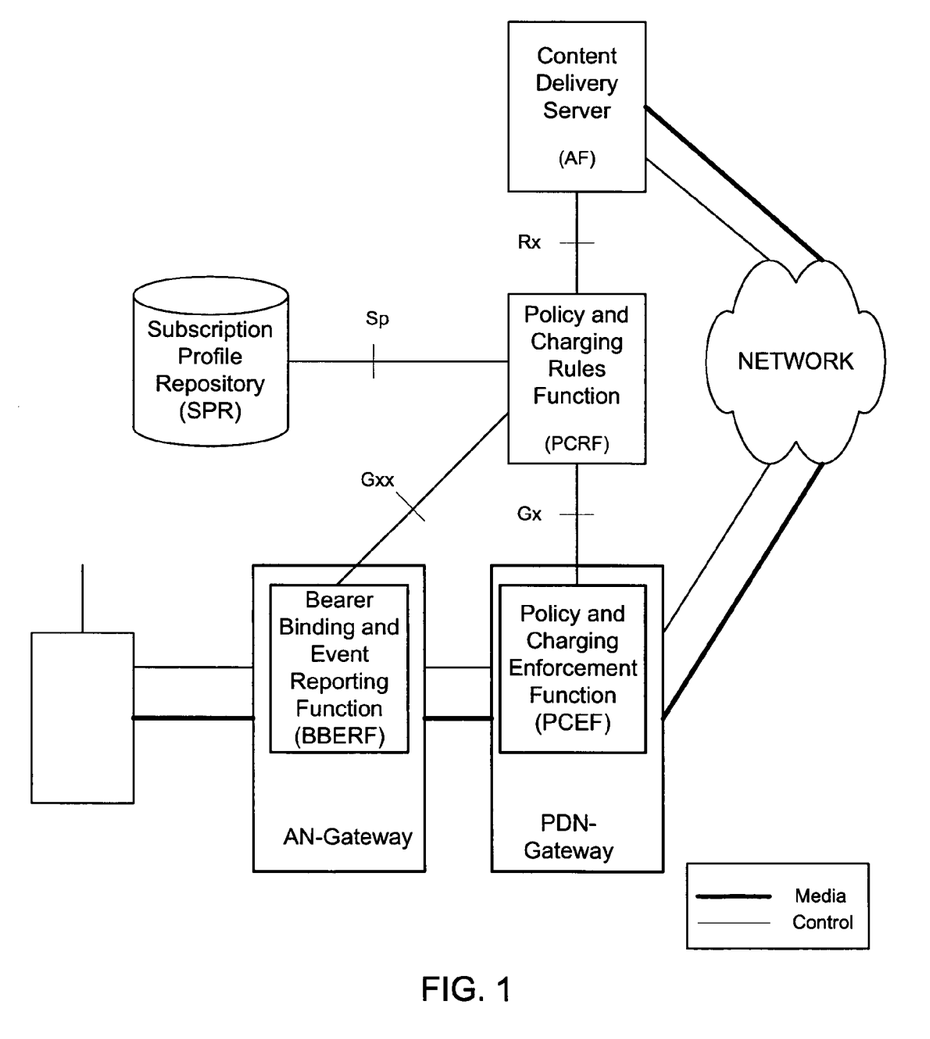
FIG. 1 shows a policy and charging control architecture with MTV server of the prior art.

FIG. 1 presents the basic outline of the PCC architecture.

The PCRF sits in between of the Application signaling plane where services are initiated and service characteristics are negotiated (e.g. via SIP/SDP) and the media plane where the actual service is being provided.

In this architecture, PCRF is responsible for accepting or rejecting the service authorization request received from the AF. Upon receiving the session information the PCRF should run the corresponding operator policies and decide whether the new medias can be accepted or not. If accepted, the PCRF will install in the PCEF the corresponding PCC rules derived from the service information received from the AF.

The PCEF will inform the PCRF about the outcome of the PCC rule installation and will initiate the bearer procedures towards the network. If there is any failure in this process, the PCRF will be informed that the enforcement could not take place.

This procedure has been standardized in both 3GPP Rel-7 and Rel-8. See 3GPP TS 29.213[3GPP TS 29.212 v. 8.1.0 Policy and Charging Control over Gx interface (Release 8)].

In Rel-8, for the cases where there are PMIP protocols between the PCEF and the AN-gateway (Access Network Gateway), the PCRF will install QoS rules towards the AN-gateway (known as BBERF, bearer binding and event reporting function). The flow between BBERF and PCRF is equivalent as the one shown here towards the PCEF. For simplicity reasons, only the PCEF is considered in the following flows.

Figure 2:
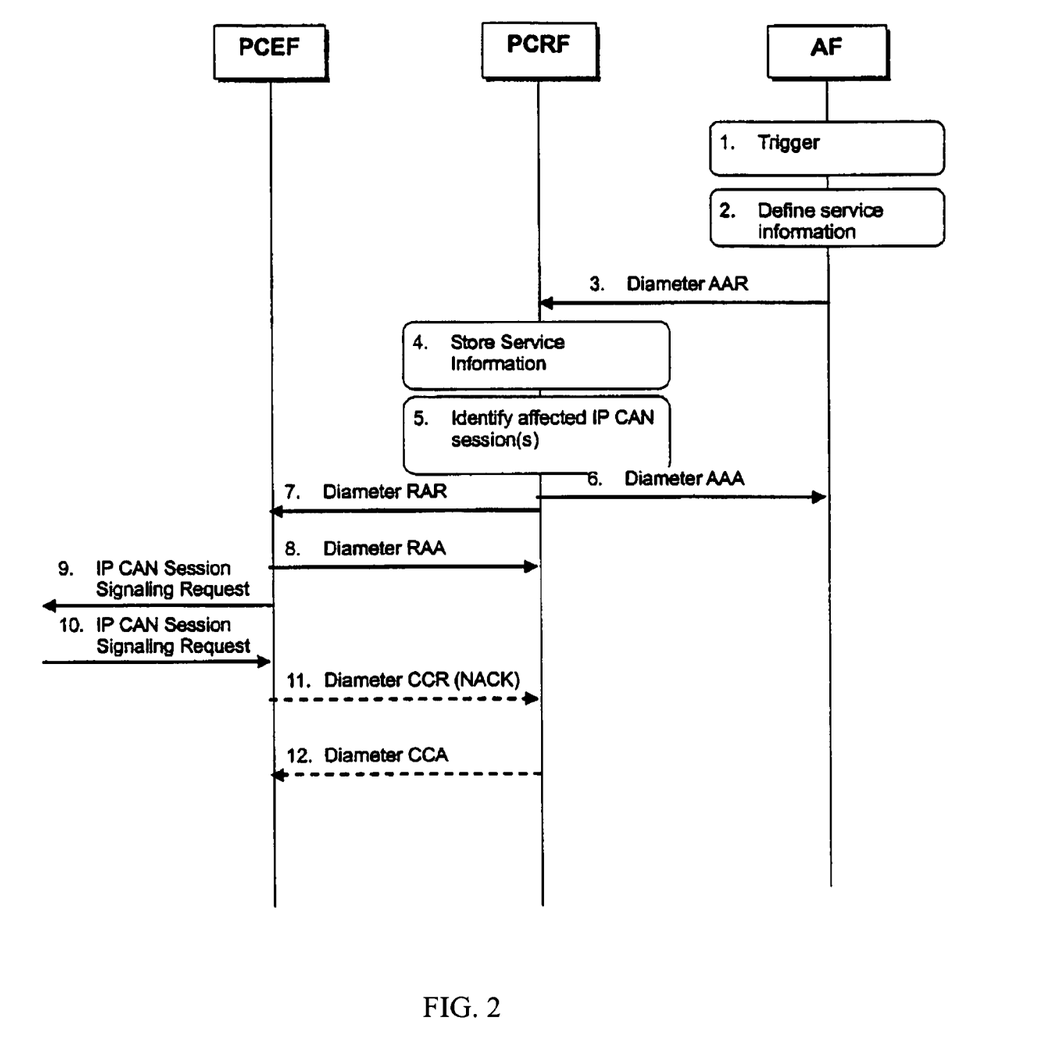
FIG. 2 shows the message exchange for successful PCC Rule provisioning of the prior art.

FIG. 2 shows signalling flows of the current message exchange. Steps 11 and 12 will only occur in the negative case.

1. The AF (e.g. a streaming server) receives an internal or external trigger to create/modify an existing AF session and provide related Service Information. Normally this will take place as a result of AF signalling (e.g. SIP/SDP) with the user where e.g. an streaming session has been established.

2. The AF identifies the Service Information needed (e.g. IP address of the IP flow(s), port numbers to be used, information on media types etc. . . . ).

3. The AF provides the Service Information to the PCRF by sending a Diameter AAR for the existing Rx Diameter session corresponding to the AF session.

4. & 5. The PCRF analyses the received Service Information and checks whether the service can be authorized. If possible, the PCRF grants the request and store the service information.

6. The PCRF sends a Diameter AAA to the AF including a positive response to the service authorization request.

7. The PCRF generates the corresponding PCC rules and initiates the IP-CAN Session modification by sending a RAR command.

8. The PCEF installs the received PCC Rules. The PCEF also enables or disables service flow according to the flow status of the corresponding PCC Rules.

9. The PCEF initiates the request for the modification of an IP-CAN bearer and enforces the authorized QoS.

10. The PCEF is notified about the outcome of the IP-CAN bearer initiated procedure.

11. If the procedure fails, the PCEF sends a Diameter CCA towards the PCRF including the PCC rules that could not be enforced.

12. The PCRF acknowledges the request.

Problems with Existing Solutions

The IP-CAN session modification procedure initiated by the PCRF has the following characteristics:

a. The AF is informed about the outcome of the service authorization procedure. However, the AF is not aware of any IP-CAN specific procedure unless it subscribes to the events that are currently defined.

b. When the AF requires to be notified of certain events that occurred in the access network it will provide the Specific-Action AVP in the Rx AAR command. Establishment and Release of Bearer can be subscribed by the application. The notification of the event will come in a new RAR command.

c. In order for the PCRF to notify about an access event to the AF, the PCRF has to subscribe to an equivalent event in the PCEF by using the Event-Trigger AVP in the Gx command. The mapping between events in Rx and Gx is not standardized. For example, there is no event in the Gx to report release of bearer.

d. Errors in the access network cannot be reported to the AF, unless it is mapped into a Specific-Action in Rx. Mapping between errors and specific actions is not standardized.

e. The PCRF can abort the AF session when there is an error in the access network.

This specific behavior has been acceptable so far as the network has been defined considering IMS as the normal client application for PCC infrastructure. In the case of IMS, the services are peer-to-peer and only the peer entities are involved in the service negotiation.

According to that, the P-CSCF (taking the AF role in PCC architecture) will not demand whether resource reservation has taken place in order to progress the service and will not alter the service negotiation based on specific access information that the PCRF can provide to the P-CSCF once the session is on course. In the normal scenario, when the access conditions cannot be fulfilled, the PCRF will initiate an AF session abortion. From the IMS point of view, PCC interaction should not mean any latency in the progress of the IMS service.

However, there are other applications that start to demand the PCC support. For example, Mobile TV has had a slow take-off due to poor user experience because of phones with poor video capabilities and that the best-effort service had a limited bandwidth (~100 kbps). However, the situation is improving today with better phones and widespread HSPA rollout.

This new type of services is not peer-to-peer kind of services, but client-to-server services. This means that the PCC architecture can provide relevant information that can influence in the AF service negotiation. This has opened the door to added value functionality that helps operators to provide adapted services considering access information, as QoS availability.

As part of the requirements demanded to the Mobile TV solution, the streaming server needs to be informed about the outcome of the resource reservation in the access network. Based on this information, the terminal can be informed when the QoS demands cannot be ensured or the charging can be adapted accordingly. Latency is also a key requirement here, so the application needs to be informed about the outcome of the bearer operation as soon as possible.

In order to fulfill these new requirements the PCRF initiated IP-CAN session modification procedure has to be adapted so that both kind of applications (IMS and non-IMS) can coexist without penalizing any of them.

With the Current Procedures:

1. Applications that require knowing the resource allocation before the progression of the service are not considered, since there is no specific event/error in the access network.

2. The Rx interface does not consider the resource reservation notification towards the applications.

Additionally, improving the flows for the new applications should not mean a degradation of current IMS services.

SUMMARY

The present invention pertains to a method for an application function (AF) device in a wireless cellular network. The method comprises the steps of determining with a processing unit whether an application service requires confirmation that a transmission path for corresponding application service media is available to progress set up of an application service session. There is the step of sending a message generated by the processing unit through a network interfacing unit to a policy and charging rule function (PCRF) server to indicate whether the application service requires confirmation that the transmission path for the corresponding application service media is available.

The present invention pertains to an application function (AF) device in a wireless cellular network. The AF device comprises a processing unit which determines whether an application service requires confirmation that a transmission path for corresponding application service media is available to progress set up of an application service session. The AF device comprises a network interfacing unit that sends a message generated by the processing unit to a policy and charging rule function (PCRF) server indicating whether the application service requires confirmation that the transmission path for the corresponding application service media is available.

The present invention pertains to a method for a policy and charging rule function (PCRF) server in a wireless cellular network. The method comprises the steps of receiving a message from an application function (AF) device at a network interfacing unit indicating whether an application service requires confirmation that a transmission path for corresponding application service media is available. There is the step of determining with a processing unit whether the transmission path is available for the corresponding application service media.

The present invention pertains to a policy and charging rule function (PCRF) server in a wireless cellular network. The PCRF server comprises a network interfacing unit which receives a message from an application function (AF) device indicating whether an application service requires confirmation that a transmission path for corresponding application service media is available. The PCRF server comprises a processing unit which determines that the transmission path is available for the corresponding application service media.

BRIEF DESCRIPTION OF THE DRAWINGS

In the accompanying drawings, the preferred embodiment of the invention and preferred methods of practicing the invention are illustrated in which:

FIG. 5 shows signaling flows of the message exchange of the present invention with TRAC=ON.

FIG. 6 is another solution which shows signaling flows of the message exchange of the present invention with TRAC=ON.

DETAILED DESCRIPTION

Figure 7:
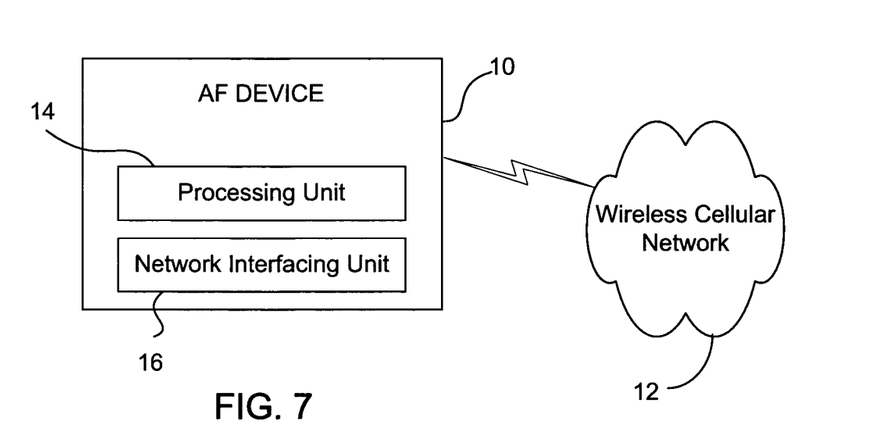
FIG. 7 is a block diagram of an application function device of the present invention.

Referring now to the drawings wherein like reference numerals refer to similar or identical parts throughout the several views, and more specifically to FIG. 7 thereof, there is shown an application function (AF) device in a wireless cellular network 12. The AF device 10 comprises a processing unit 14 which determines whether an application service requires confirmation that a transmission path for corresponding application service media is available to progress set up of an application service session. The AF device 10 comprises a network interfacing unit 16 that sends a message generated by the processing unit 14 to a policy and charging rule function (PCRF) server indicating whether the application service requires confirmation that the transmission path for the corresponding application service media is available.

It should be noted that the network interfacing unit 16 may include multiple portions or components, such as ports, so that messages or signals received at or sent from a network interfacing unit 16 may be received or sent from different portions or components of the network interfacing unit 16.

The network interfacing unit 16 may receive a confirmation message that the transmission path is available for the corresponding application service media. The processing unit 14 may progress with the setup for the application service session after the network interfacing unit 16 receives a confirmation message that transmission path is available for the corresponding application service media. The network interfacing unit 16 may send service information to the PCRF server 18 by sending a diameter AAR for an Rx diameter session corresponding to the application service session.

The network interfacing unit 16 may send a message to the PCRF server 18 indicating that the AF device 10 either will or will not wait for the confirmation that the transmission path for the corresponding application service media is available. The processing unit 14 may identify the service information needed for description of the corresponding application service media. The network interfacing unit 16 may receive a trigger to create a new, or modify an existing, application service session and to provide the description of the corresponding application service media to the PCRF server 18.

The present invention pertains to a method for an application function (AF) device in a wireless cellular network 12. The method comprises the steps of determining with a processing unit 14 whether an application service requires confirmation that a transmission path for corresponding application service media is available to progress set up of an application service session. There is the step of sending a message generated by the processing unit 14 through a network interfacing unit 16 to a policy and charging rule function (PCRF) server to indicate whether the application service requires confirmation that the transmission path for the corresponding application service media is available.

There may be the step of receiving a confirmation message at the network interfacing unit 16 that the transmission path is available for the corresponding application service media. There may be the step of the processing unit 14 progressing with the set up for the application service session when the confirmation that transmission path is available for the corresponding application service media is received. There may be the step of sending service information from the network interfacing unit 16 to the PCRF server 18 by sending a diameter AAR for an Rx diameter session corresponding to the application service session.

There may be the step of sending a message from the network interfacing unit 16 to the PCRF server 18 indicating that the AF device 10 either will or will not wait for the confirmation that the transmission path for the corresponding application service media is available. There may be the step of the processing unit 14 identifying the service information needed for description of the corresponding application service media. There may be the step of the network interfacing unit 16 receiving a trigger to create a new, or modify an existing, application service session and providing the description of the corresponding application service media to the PCRF server 18.

Figure 8:
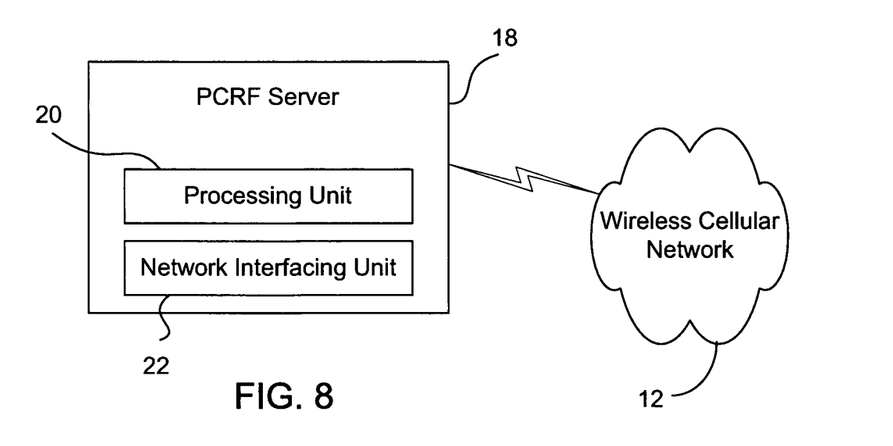
FIG. 8 is a block diagram of a policy and charging rule function server of the present invention.

The present invention pertains to a method for a policy and charging rule function (PCRF) server in a wireless cellular network 12. The method comprises the steps of receiving a message from an application function (AF) device at a network interfacing unit 22 indicating whether an application service requires confirmation that a transmission path for corresponding application service media is available. There is the step of determining with a processing unit 20 whether the transmission path is available for the corresponding application service media.

There may be the step of sending from the network interfacing unit 22 to the AF device 10 authorization for the application service session only after the transmission path for the corresponding application service media is available when the AF device 10 requires confirmation that the transmission path for the corresponding application service media is available.

There may be the step of sending from the network interfacing unit 22 to the AF device 10 authorization for the application service session before the transmission path for the corresponding application service media is available when the AF device 10 does not require confirmation that the transmission path for the corresponding application service media is available or when the AF requests to be informed about the availability outcome but without delaying the application service setup. There may be the step of sending from the network interfacing unit 22 a notification to the AF device 10 about the availability outcome when the AF device 10 has requested the notification.

In an alternative embodiment, the receiving step may include the step of receiving at the network interfacing means the message from the AF device 10 having service information. There may be the step of analyzing with the processing unit 20 the service information and checking whether the service can be authorized. There may be the step of the processing unit 20 checking whether the availability of the transmission path for the corresponding application service media has to be announced. There may be the step of the processing unit 20 identifying a related IP-CAN session. There may be the step of the processing unit 20 generating corresponding PCC rules and initiating an IP-CAN session modification by sending a RAR command. There may be the step of sending from the network interfacing unit 22 a message to a policy and charging enforcement function (PCEF) sever indicating whether an explicit notification on availability of the transmission path for the corresponding application service media is or is not needed. There may be the step of receiving at the network interfacing unit 22 a message from the PCEF server acknowledging a request for the modification of the IP-CAN session.

In another embodiment the receiving step includes the step of the network interfacing unit 22 receiving the service information from the AF device 10 in a diameter AAR for an Rx diameter session corresponding to the application service session. The receiving step may include the step of the network interfacing unit 22 receiving a message from the AF device 10 indicating whether or not the AF device 10 will wait for the confirmation that the transmission path for the corresponding application service media is available. There may be the step of the processing unit 20 granting the request towards the AF device 10 when the AF device 10 has indicated that announcement on availability of the transmission path for the corresponding application service media is not required.

There can be the step of sending a confirmation message from the network interfacing unit 20 to the AF device 10 that the transmission path is available for the corresponding application service media. There can be the step of storing the service information in a memory.

The present invention pertains to a policy and charging rule function (PCRF) server in a wireless cellular network 12, as shown in FIG. 8. The PCRF server 18 comprises a network interfacing unit 22 which receives a message from an application function (AF) device indicating whether an application service requires confirmation that a transmission path for corresponding application service media is available. The PCRF server 18 comprises a processing unit 20 which determines that the transmission path is available for the corresponding application service media.

The network interfacing unit 22 may send to the AF device 10 authorization for the application service session only after the transmission path for the corresponding application service media is available when the AF device 10 requires confirmation that the transmission path for the corresponding application service media is available.

The network interfacing unit 22 may send to the AF device 10 authorization for the application service session before the transmission path for the corresponding application service media is available when the AF device 10 does not require confirmation that the transmission path for the corresponding application service media is available or when the AF device 10 requests to be informed about the availability outcome but without delaying the application service setup. The network interfacing unit 22 may send a notification to the AF device 10 about the availability outcome when the AF device 10 has requested the notification.

In an alternative embodiment, the network interfacing unit 22 may receive a message from the AF device 10 having service information. The processing unit 20 may analyze the service information and checks whether the service can be authorized. The processing unit 20 checks whether the availability of the transmission path for the corresponding application service media has to be announced. The processing unit 20 can identify a related IP-CAN session. The processing unit 20 may generate corresponding PCC rules and initiates an IP-CAN session modification by sending a RAR command. The network interfacing unit 22 may send a message to a policy and charging enforcement function (PCEF) server indicating whether an explicit notification on the availability of the transmission path for the corresponding application service media is or is not needed. The network interfacing unit 22 may receive a message from the PCEF server acknowledging a request for the modification of the IP-CAN session.

In another embodiment the network interfacing unit 22 may receive the service information from the AF device 10 in a diameter AAR for an Rx diameter session corresponding to the application service session. The network interfacing unit 22 may receive a message from the AF device 10 indicating whether or not the AF device 10 will wait for the confirmation that the transmission path for the corresponding application service media is available. The processing unit 20 may grant the request towards the AF device 10 when the AF device 10 has indicated that announcement on availability of the transmission path for the corresponding application service media is not required.

The network interfacing unit 22 may send a confirmation message to the AF device 10 that the transmission path is available for the corresponding application service media. The PCRF server 18 may include a memory 24 in which the service information is stored.

The application described above can be for mobile TV.

In the operation of the invention, there are:

Mechanisms in all the elements in the PCC architecture to allow the intelligence to adapt the network behavior to the Application needs with regards to transmission resource allocation.

Needed changes to the interfaces to carry the information elements that allow differentiating the possible cases: when transmission resource allocation is a needed condition and when not.

Needed changes in the interfaces to allow the proper information flow between the bearer and application level included what of the application demands were allocated.

Figure 3:
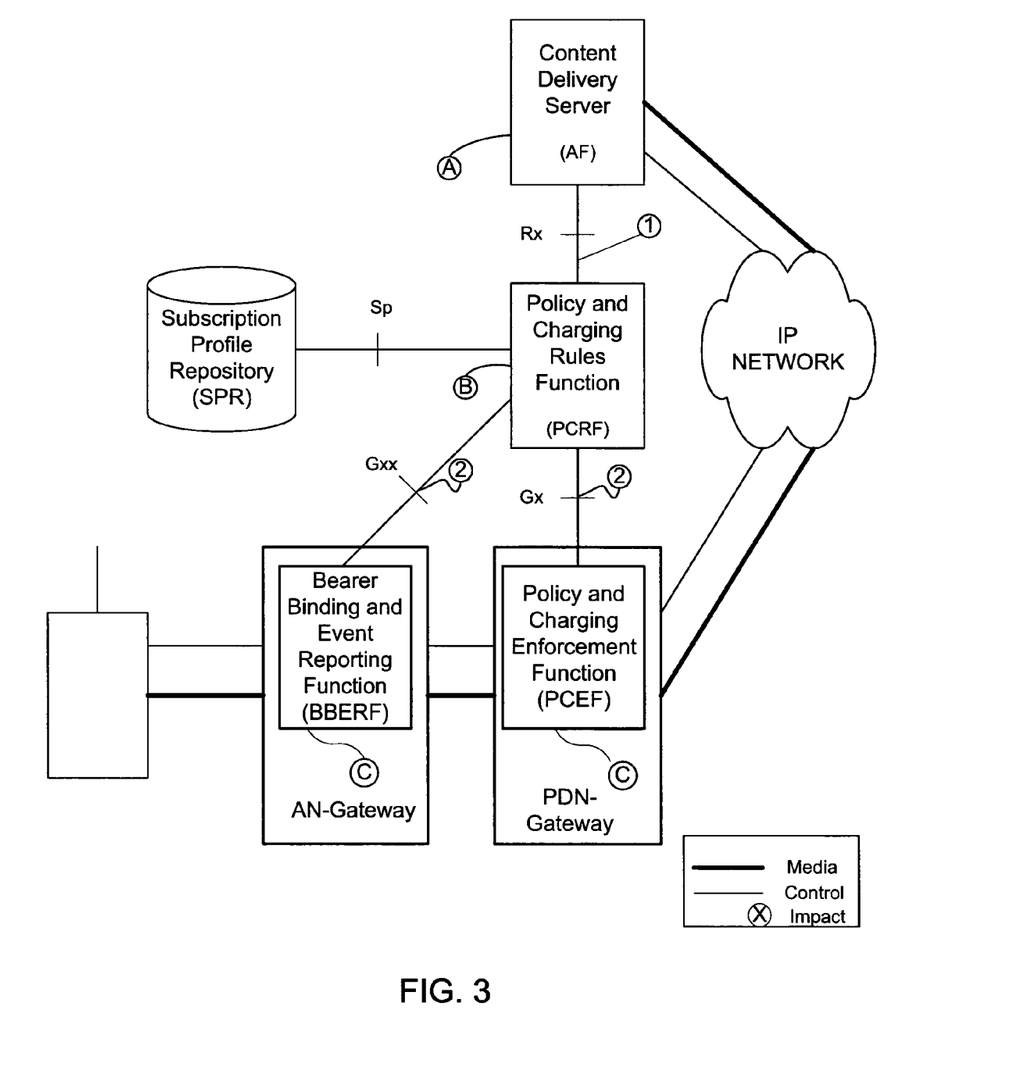
FIG. 3 shows a policy and changing control architecture with MTV server of the present invention.

Referring to FIG. 3, the present invention has the following impacts in the PCC architecture:

The Application Function (AF) that sends current service information to the PCC architecture so that it can establish the appropriate bearer procedures shall be impacted as follows:

A: Logic that determines whether a particular service needs transmission path confirmation to be established. If so, the AF will be able to progress the service session set up, only when the confirmation that the bearer path is established arrives. For instance, in the case of a Mobile TV application there is no negotiation between the terminal and the AF (i.e. the Mobile TV server) regarding the establishment of appropriate transmission resources to provide the service (e.g. Video-on-Demand or watching live TV). Therefore the AF must ensure by other techniques that appropriate resources are indeed established to be able to provide the service with satisfactory quality. The PCC architecture, as enhanced with this invention, provides such techniques.

1: Modification of the Rx reference point (interface between the AF and the PCRF to send service information):
  to include whether transmission resources status need to be announced.

The PCRF, that sits in between of the Application signaling plane where services are initiated and service characteristics are negotiated (e.g. via SIP/SDP) and the media plane where the actual service is being provided, apart from authorizing the service information and installing adequate PCC rules in the PCEF is impacted as follows:

B: Logic at the PCRF that allows adapting the interactions to the AF requirements.
  If transmission resources need to be confirmed, send "GO" notification to the AF only when this happens. This could be the case of a Mobile TV application, provided that the session setup time is not too critical. For instance if it is a Video-on-Demand service, users might not mind too much waiting 5-10 seconds until the movie starts playing.
  If transmission resources do not need to be confirmed or if the AF wants to be informed about the outcome of the resource establishment but without delaying the session setup, send "GO" notification now. The latter would be the typical case of a Mobile TV application, i.e. the Mobile TV server wants to make sure that appropriate resources are established for the session, but it doesn't want to delay the session setup too much as users typically like fast response times.
  If requested by the AF, send a notification about the outcome of the resource establishment.

2: Modification of the Gx/Gxx reference points (interfaces between the PCRF and the PCEF/BBERF (i.e. access gateways))
  to indicate whether explicit transmission-resources-allocation notifications are needed.
  Further impacts are to include specific errors that notify the failure of the transmission resources modification procedure.

The PCEF and/or BBERF (i.e. the access gateways in the IP-CAN network), that currently installs the PCC rules provided by the PCRF in order to perform flow detection and appropriate charging and QoS control, is also impacted as follows:

C: Logic at the Gateways that allow adapting the response according with the service requirements:

If transmission resources need to be confirmed, initiate the bearer modification procedures and send result back to the PCRF only when this has been finished with the corresponding result.

If transmission resources do not need to be confirmed, send "GO" message to the PCRF as soon as the action can be started.

Signaling Flows

There could be a number of solutions that could solve this issue.

TRAC=Transmission-Resources Allocation Confirmation
TRAC=OFF

Figure 4:
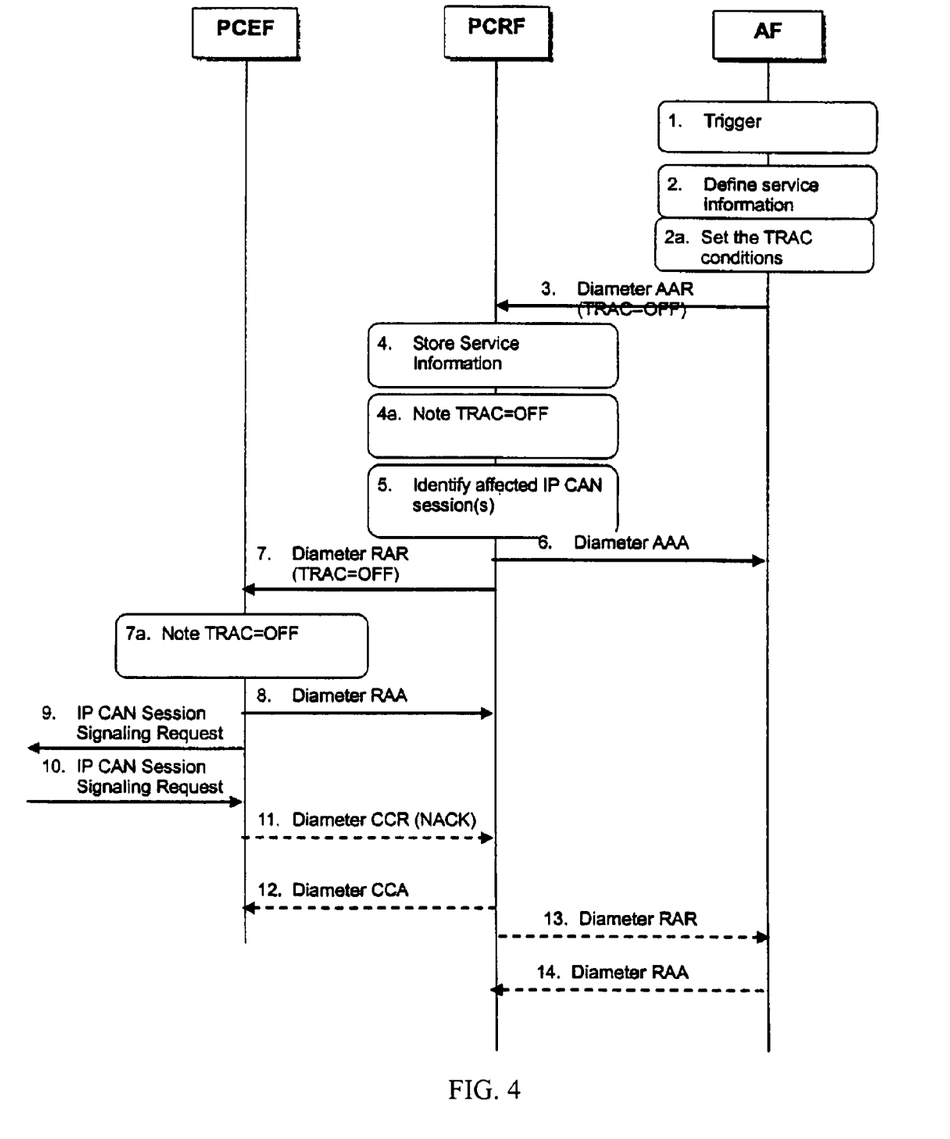
FIG. 4 shows signaling flows of the message exchange of the present invention with TRAC=OFF.

The signaling flow shown in FIG. 4 would be valid for this case.

The flow in this case would be as follows.

1. The AF (e.g. a streaming server) receives an internal or external trigger to create/modify an existing AF session and provide related Service Information. Normally this will take place as a result of AF signalling (e.g. SIP/SDP) with the user where e.g. a streaming session has been established.

2. The AF identifies the Service Information needed (e.g. IP address of the IP flow(s), port numbers to be used, information on media types etc. . . . ).

2a. As part of the invention, the AF will determine if the service needs transmission path confirmation in order for the service to proceed. In this case, it is not required.

3. The AF provides the Service Information to the PCRF by sending a Diameter AAR for the existing Rx Diameter session corresponding to the AF session. Additionally the AF shall indicate to the PCRF that the AF will not wait for the resource allocation, i.e. that the PCRF does not need to announce the resource status.

4. The PCRF analyses the received Service Information and checks whether the service can be authorized. If possible, the PCRF stores the service information.

4a. Additionally, the PCRF shall check whether it has to announce the transmission resource status once allocated. In this case it is not required.

5. PCRF will identify the related IP-CAN sessions.

6. Since the AF indicated that that the resource allocation announcement was not required, the PCRF would grant the request towards the AF.

7. The PCRF generates the corresponding PCC rules and initiates the IP-CAN Session modification by sending a RAR command. Additionally, the PCRF would indicate that the explicit transmission of resource allocation notification is not needed.

7a. The PCEF stores this indication.

8. The PCEF installs the received PCC Rules. The PCEF also enables or disables service flow according to the flow status of the corresponding PCC Rules. Since the PCRF indicated that the resource allocation notification was not needed, the PCEF answers back before requesting the modification of an IP-CAN bearer.

9. The PCEF initiates the request for the modification of an IP-CAN bearer and enforces the authorized QoS.

10. The PCEF is notified about the outcome of the IP-CAN bearer initiated procedure.

11. If the procedure fails, the PCEF sends a Diameter CCR towards the PCRF including the PCC rules that could not be enforced.

12. The PCRF acknowledges the request.

13. If the AF subscribed to the resource allocation event, the PCRF would notify the AF.

14. The AF acknowledges the request.

TRAC=ON

Figure 5:
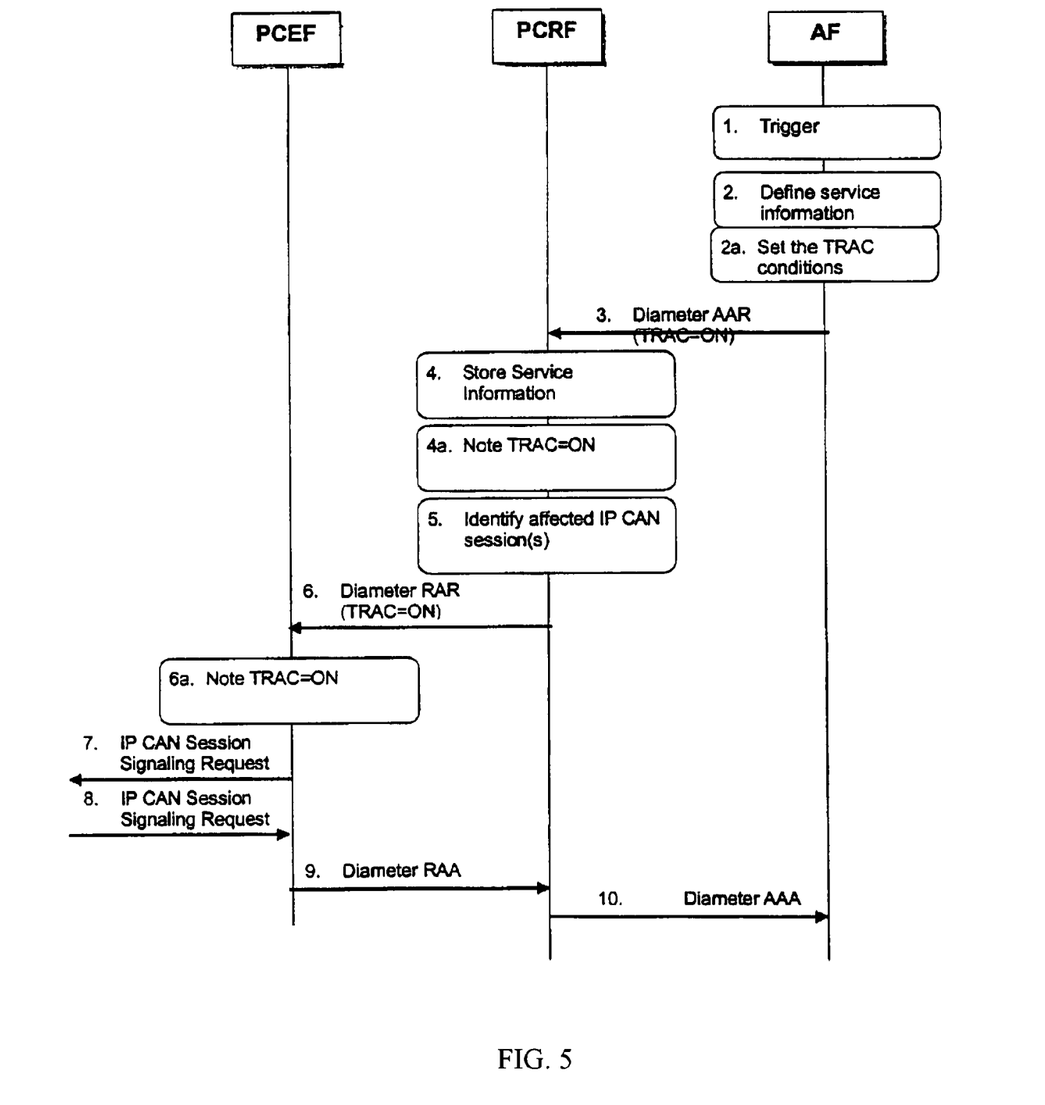

With reference to FIG. 5, the solution in regard to the flow for this instance is described as follows.

1. The AF (e.g. a Mobile TV server) receives an internal or external trigger to create/modify an existing AF session and provide related Service Information. Normally this will take place as a result of AF signalling (e.g. SIP/SDP) with the user where e.g. a Mobile TV session has been established.

2. The AF identifies the Service Information needed (e.g. IP address of the IP flow(s), port numbers to be used, information on media types etc. . . . ).

2a. As part of the invention, the AF will determine if the service needs transmission path confirmation in order for the service to proceed. In this case (for instance a Mobile TV application), it is required.

3. The AF provides the Service Information to the PCRF by sending a Diameter AAR for the existing Rx Diameter session corresponding to the AF session. Additionally the AF shall indicate to the PCRF that the AF will wait for the resource allocation, i.e. that the PCRF needs to announce the resource status for the service to proceed.

4. The PCRF analyses the received Service Information and checks whether the service can be authorized. If possible, the PCRF stores the service information.

4a. Additionally, the PCRF shall check whether it has to announce the transmission resource status once allocated. In this case, it is required.

5. PCRF will identify the related IP-CAN session.

6. Since the AF indicated that the resource allocation announcement was required, the PCRF would not initiate any action towards the AF at this point. The PCRF generates the corresponding PCC rules and initiates the IP-CAN Session modification by sending a RAR command. Additionally, the PCRF would indicate that the explicit transmission of resource allocation notification is needed.

6a. The PCEF stores this indication.

7. The PCEF installs the received PCC Rules. The PCEF also enables or disables service flow according to the flow status of the corresponding PCC Rules. Since the PCRF indicated that the resource allocation notification was needed, the PCEF initiates the request for the modification of an IP-CAN bearer and enforces the authorized QoS.

8. The PCEF is notified about the outcome of the IP-CAN bearer initiated procedure.

9. The PCEF notifies the PCRF about the outcome of the IP-CAN bearer initiated procedure.

10. The PCRF notifies the AF about the outcome of the resource allocation procedure. If the outcome is a failure to allocate the required resources, the AF may either tear down the AF session or proceed with the session while taking further appropriate actions (e.g. signalling to the billing system that the user should be entitled to a discount as the network 12 could not provide adequate quality of service guaranties).

Figure 6:
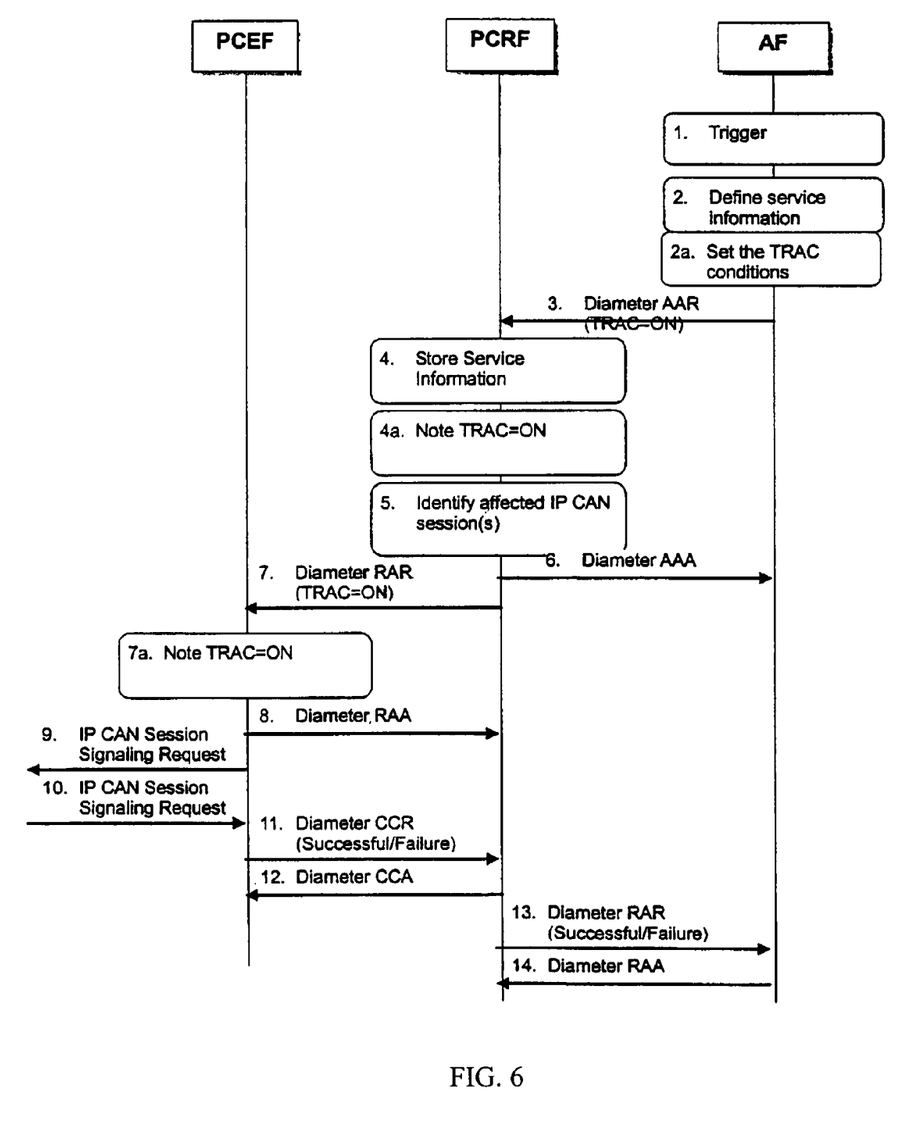

The solution shown in FIG. 6 is the easiest case from Standardization point of view. The implementation would use:

New event trigger for Gx to indicate resource allocation success

New failure code in Gx to indicate failure

New event for Rx to indicate resource allocation success/failure

The flow in this case would be as follows.

1. The AF (e.g. a Mobile TV server) receives an internal or external trigger to create/modify an existing AF session and provide related Service Information. Normally this will take place as a result of AF signalling (e.g. SIP/SDP) with the user where e.g. a Mobile TV session has been established.

2. The AF identifies the Service Information needed (e.g. IP address of the IP flow(s), port numbers to be used, information on media types etc. . . . ).

2a. As part of the invention, the AF will determine if the service needs transmission path confirmation in order for the service to proceed. In this case (for instance a Mobile TV application), it is required.

3. The AF provides the Service Information to the PCRF by sending a Diameter AAR for the existing Rx Diameter session corresponding to the AF session. Additionally the AF shall indicate to the PCRF that the AF requires confirmation of the resource allocation, i.e. that the PCRF needs to announce the outcome of the resource allocation to the AF as soon as it is known.

4. The PCRF analyses the received Service Information and checks whether the service can be authorized. If possible, the PCRF stores the service information.

4a. Additionally, the PCRF shall check whether it has to announce the transmission resource status once allocated. In this case it is required.

5. The PCRF will identify the related IP-CAN session.

6. The PCRF will grant the request towards the AF.

7. The PCRF generates the corresponding PCC rules and initiates the IP-CAN Session modification by sending a RAR command. Additionally, since the AF indicated that the resource allocation announcement was required, the PCRF would indicate the PCEF that the explicit transmission of resource allocation notification is needed.

7a. The PCEF stores this indication.

8. The PCEF installs the received PCC Rules. The PCEF also enables or disables service flow according to the flow status of the corresponding PCC Rules. The PCEF acknowledges the PCRF about the outcome of PCC rule installation.

9. The PCEF initiates the request for the modification of an IP-CAN bearer and enforces the authorized QoS.

10. The PCEF is notified about the outcome of the IP-CAN bearer initiated procedure.

11. Since the PCRF indicated that the resource allocation indication was required, the PCEF notifies the PCRF about the outcome of the IP-CAN bearer initiated procedure.

12. The PCRF acknowledges the request.

13. Since the AF indicated that the resource allocation indication was needed, the PCRF notifies the AF about the outcome of the resource allocation procedure.

14. The AF acknowledges the request. If the outcome is a failure to allocate the required resources, the AF may either tear down the AF session or proceed with the session while taking further appropriate actions (e.g. signalling to the billing system that the user should be entitled to a discount as the network 12 could not provide adequate quality of service guaranties).

Protocol Solution
   SDF reporting reservation status reported to AF:
   New AVPs to announce how the AF wants to be notified
   New Specific Action value for Rx notification
   New Event trigger in Gx
   New errors to indicate failure at allocation process Additional Embodiments More detailed notification over Rx including media components/subcomponents.

The invention presented provides for the following advantages:

1. Allows configurable service setup to maximize efficiency and flexibility; i.e., the service can be configured to be either setup as soon as possible avoiding delays in the setup time (option 1), or setup only after the establishment of the bearer has been fully confirmed (option 2). This allows application, such as IMS or M-TV, request the establishment way that best suites them.

2. PCC control is dynamically adapted to the service characteristics and needs; i.e., according to the needs that the application can demand (see advantage #1), PCC can adapt to answer immediately to the application or delay the answer till the PCRF explicitly knows that the transmission path is ready.

3. Services that require transmission resource allocation can have negative/positive feedback before progressing the signaling. I.e. in case o option 2 in advantage #1 above, the PCC system is able to do both: send positive confirmation that the resource have been successfully allocated (option 1) or, send an answer stating that the transmission resource could not be allocated with an optional reason (option 2).

4. AF may take further actions in case of negative response (e.g. charging, QoS, etc), i.e., by having the option 2 in advantage #3, the service has the opportunity of taking further actions as needed as soon as possible (when the notification arrives). For instance, the AF could inform the billing system that the user should receive a discount on the price of the movie it requested since the quality of service could not be guaranteed.

Abbreviations
   AF Application Function
   AN-GW Access Network Gateway
   BBERF Bearer Binding and Event Reporting Function
   MTV Mobile TV
   PCEF Policy and Charging Enforcement Function
   PCRF Policy and Charging Rule Function
   UE User Equipment Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method for an Application Function (AF) device in a wireless cellular network, the method comprising:
   sending an authorization request for an application service to a Policy and Charging Rule Function (PCRF) server;
   determining with a processing unit in the AF device that the application service requires confirmation that a transmission path for corresponding application service media is available to progress set up of an application service session;
   sending a first message generated by the processing unit through a network interfacing unit to the PCRF server to indicate that the application service requires confirmation that the transmission path for the corresponding application service media is available, and whether waiting for such confirmation is required;
   when waiting for the confirmation is required, waiting until receiving a confirmation message at the network interfacing unit that the transmission path is available for the corresponding application service media, and progressing at the processing unit with the set up for the application service session upon receiving from the PCRF server the authorization for the application service; and when waiting for the confirmation is not required, progressing at the processing unit with the set up for the application service session upon receiving from the PCRF server the authorization for the application service.

2. The method as described in claim 1 wherein progressing with the set up for the application service session comprises progressing with the set up for the application service session when the confirmation that the transmission path is available for the corresponding application service media is received.

3. The method as described in claim 1 wherein progressing with the set up for the application service session comprises progressing with the set up for the application service session before receiving the confirmation that transmission path is available for the corresponding application service media.

4. The method as described in claim 1 further comprising sending a second message from the network interfacing unit to the PCRF server indicating whether the AF device will wait for the confirmation that the transmission path for the corresponding application service media is available.

5. An Application Function (AF) device in a wireless cellular network for sending an authorization request for an application service to a Policy and Charging Rule Function (PCRF) server, and for receiving from the PCRF server an authorization for the application service, the AF device comprising:

a processing unit configured to determine that an application service requires confirmation that a transmission path for corresponding application service media is available to progress set up of an application service session;

a network interfacing unit configured to send a message generated by the processing unit to the PCRF server indicating that the application service requires confirmation that the transmission path for the corresponding application service media is available, and whether waiting for such confirmation is required;

when waiting for the confirmation is required, the network interfacing unit further configured to wait until receiving a confirmation message that the transmission path is available for the corresponding application service media, and the processing unit further configured to progress with the set up for the application service session upon receiving from the PCRF server the authorization for the application service; and when waiting for the confirmation is not required, the processing unit further configured to progress with the set up for the application service session upon receiving from the PCRF server the authorization for the application service.

6. The AF device as described in claim 5 wherein the processing unit is configured to progress with the set up for the application service session upon receipt of the confirmation that transmission path is available for the corresponding application service media.

7. The AF device as described in claim 5 wherein the network interfacing unit is further configured to send a second message to the PCRF server indicating whether the AF device will wait for the confirmation that the transmission path for the corresponding application service media is available.

8. The AF device as described in claim 7 wherein the processing unit is configured to progress with the set up for the application service session without waiting for the confirmation that transmission path is available for the corresponding application service media.

9. A method for a Policy and Charging Rule Function (PCRF) server in a wireless cellular network comprising:

receiving from an Application Function (AF) device an authorization request for an application service;

receiving a first message from the AF device at a network interfacing unit indicating that the application service requires confirmation that a transmission path for corresponding application service media is available, and whether waiting for such confirmation is required;

when waiting for the confirmation is required, determining with a processing unit in the PCRF server whether the transmission path is available for the corresponding application service media, sending a confirmation message from the network interfacing unit to the AF device when the transmission path is available for the corresponding application service media, and sending to the AF device an authorization for the application service; and when waiting for the confirmation is not required, sending to the AF device the authorization for the application service.

10. The method as described in claim 9 wherein sending the authorization for the application service comprises sending the authorization for the application service only after the transmission path for the corresponding application service media is available when the AF device requires confirmation that the transmission path for the corresponding application service media is available.

11. The method as described in claim 9 further comprising sending from the network interfacing unit a notification to the AF device about the availability outcome when the AF device has requested the notification.

12. The method as described in claim 9 further comprising checking in the processing unit whether the availability of the transmission path for the corresponding application service media has to be announced.

13. The method as described in 12 claim further comprising sending from the network interfacing unit a second message to a Policy and Charging Enforcement Function (PCEF) server indicating whether an explicit notification on availability of the transmission path for the corresponding application service media is needed.

14. The method as described in claim 9 wherein receiving the first message further comprises receiving a second message from the AF device indicating whether the AF device will wait for the confirmation that the transmission path for the corresponding application service media is available.

15. A Policy and Charging Rule Function (PCRF) server in a wireless cellular network for receiving an authorization request for an application service from an Application Function (AF) device, and for sending an authorization for the application service to the AF device, the PCRF server comprising:

a network interfacing unit configured to receive a message from the AF device indicating that the application service requires confirmation that a transmission path for corresponding application service media is available, and whether waiting for such confirmation is required;

when waiting for the confirmation is required, a processing unit configured to determine whether the transmission path is available for the corresponding application service media, wherein the network interfacing unit is further configured to send a confirmation message to the AF device when the transmission path is available for the corresponding application service media, and to send to the AF device the authorization for the application service; and when waiting for the confirmation is not required, the network interfacing unit is further configured to send to the AF device the authorization for the application service.

16. The PCRF server as described in claim 15 wherein the network interfacing unit is configured to send the authorization for the application service to the AF device only after the transmission path for the corresponding application service media is available when the AF device requires confirmation that the transmission path for the corresponding application service media is available.

17. The PCRF server as described in claim 15 wherein the network interfacing unit is configured to send the authorization for the application service to the AF device before the transmission path for the corresponding application service media is available when the AF device does not require confirmation that the transmission path for the corresponding application service media is available or when the AF device requests to be informed about the availability outcome but without delaying the application service setup.

18. The PCRF server as described in claim 17 wherein the network interfacing unit is configured to send a notification to the AF device about the availability outcome when the AF device has requested the notification.

19. The PCRF server as described in claim 15 wherein the processing unit is further configured to check whether the availability of the transmission path for the corresponding application service media has to be announced.

20. The PCRF server as described in claim 15 wherein the network interfacing unit sends a second message to a Policy and Charging Enforcement Function (PCEF) server indicating whether an explicit notification on the availability of the transmission path for the corresponding application service media is needed.

21. The PCRF server as described in claim 15 wherein the application service comprises a mobile television service.

* * * * *

UNITED STATES PATENT AND TRADEMARK OFFICE
CERTIFICATE OF CORRECTION

PATENT NO. : 8,725,881 B2  
APPLICATION NO. : 13/146430  
DATED : May 13, 2014  
INVENTOR(S) : Pastor Balbas et al.

Page 1 of 1

It is certified that error appears in the above-identified patent and that said Letters Patent is hereby corrected as shown below:

On the Title Page, Item (57), under "ABSTRACT", in Column 2, Line 8, delete "(PCRP)" and insert -- (PCRF) --, therefor.

In the Specification

In Column 1, Line 57, delete "medias" and insert -- media --, therefor.

In the Claims

In Column 14, Line 40, in Claim 13, delete "12 claim" and insert -- claim 12 --, therefor.

Signed and Sealed this
Twenty-eighth Day of October, 2014

Michelle K. Lee
*Deputy Director of the United States Patent and Trademark Office*